(12) United States Patent
Freienstein et al.

(10) Patent No.: US 10,254,757 B2
(45) Date of Patent: Apr. 9, 2019

(54) METHOD AND CONTROL UNIT FOR SETTING AN ACTIVATION SIGNAL FOR ACTIVATING AT LEAST ONE SAFETY DEVICE OF A VEHICLE

(71) Applicant: Robert Bosch GmbH, Stuttgart (DE)

(72) Inventors: Heiko Freienstein, Weil der Stadt (DE); Josef Kolatschek, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 125 days.

(21) Appl. No.: 15/419,581

(22) Filed: Jan. 30, 2017

(65) Prior Publication Data

US 2017/0227958 A1   Aug. 10, 2017

(30) Foreign Application Priority Data

Feb. 5, 2016   (DE) .................. 10 2016 201 805

(51) Int. Cl.
  *G05D 1/00*   (2006.01)
  *B60N 2/02*   (2006.01)
  *B60R 21/01*  (2006.01)
  *B60R 22/48*  (2006.01)
(52) U.S. Cl.
  CPC ......... *G05D 1/0055* (2013.01); *B60N 2/0276* (2013.01); *B60R 21/01* (2013.01); *B60R 22/48* (2013.01); *B60R 2021/01211* (2013.01)
(58) Field of Classification Search
  CPC .... G05D 1/0055; B60N 2/0276; B60R 21/01; B60R 22/48; B60R 2021/01211
  See application file for complete search history.

(56) References Cited

U.S. PATENT DOCUMENTS

| | | | | |
|---|---|---|---|---|
| 6,312,013 | B1* | 11/2001 | Baur | B60R 21/0132 280/735 |
| 2013/0166153 | A1* | 6/2013 | Ito | F02D 29/02 701/45 |
| 2014/0358328 | A1* | 12/2014 | Fassbender | B60T 8/17558 701/1 |
| 2015/0137492 | A1* | 5/2015 | Rao | B60R 21/017 280/729 |
| 2015/0309512 | A1* | 10/2015 | Cudak | G05D 1/0287 701/23 |
| 2016/0055750 | A1* | 2/2016 | Linder | G08G 1/16 340/905 |
| 2017/0305349 | A1* | 10/2017 | Naboulsi | B60R 1/04 |
| 2018/0099679 | A1* | 4/2018 | Huang | B60W 50/14 |

FOREIGN PATENT DOCUMENTS

DE   102011084204 A1   4/2013

* cited by examiner

*Primary Examiner* — Thomas G Black
*Assistant Examiner* — Sze-Hon Kong
(74) *Attorney, Agent, or Firm* — Norton Rose Fulbright US LLP; Gerard Messina

(57) ABSTRACT

A method for setting an activation signal for activating at least one safety device of a vehicle. The method includes reading in a driving mode signal. In this case, the driving mode signal represents an item of information as to whether a manual driving mode or an at least partially automatic driving mode of the vehicle is set. The method also includes adapting at least one parameter of the activation signal while using the driving mode signal, to set the activation signal.

10 Claims, 2 Drawing Sheets

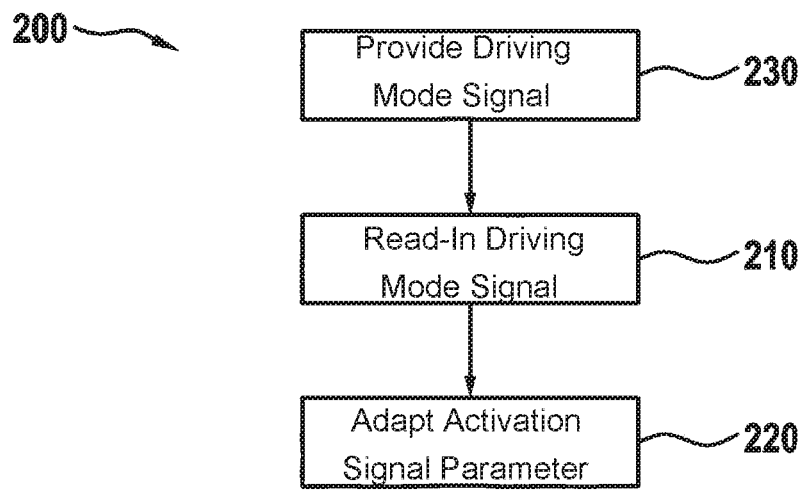
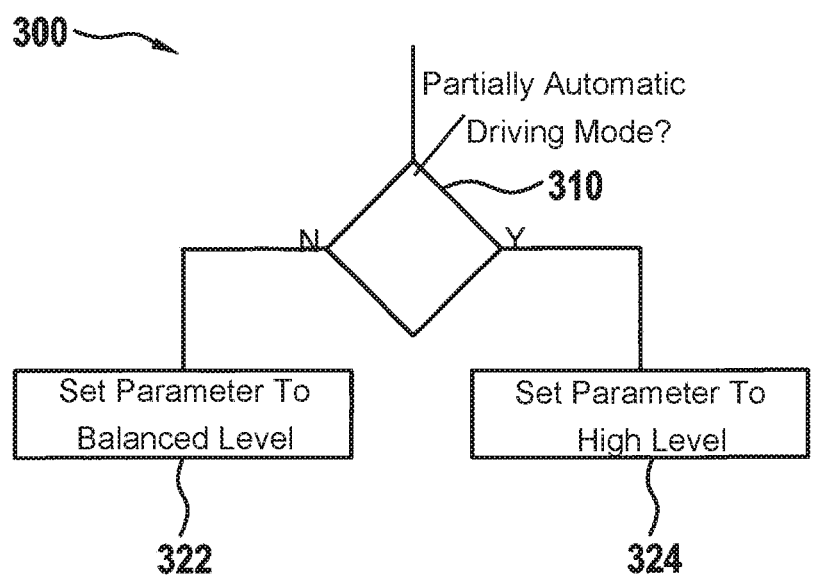

METHOD AND CONTROL UNIT FOR SETTING AN ACTIVATION SIGNAL FOR ACTIVATING AT LEAST ONE SAFETY DEVICE OF A VEHICLE

RELATED APPLICATION INFORMATION

The present application claims priority to and the benefit of German patent application no. 10 2016 201 805.1, which was filed in Germany on Feb. 5, 2016, the disclosure of which is incorporated herein by reference.

FIELD OF THE INVENTION

The present invention is directed to a control unit or a method for setting an activation signal for activating at least one safety device of a vehicle. The present invention is also directed to a computer readable medium for setting an activation signal for activating at least one safety device of a vehicle.

BACKGROUND INFORMATION

At least one passenger protection device and at least one restraint arrangement, which may be referred to herein as safety devices, for example, may be installed in a motor vehicle to protect passengers of the vehicle in the event of an accident.

Patent document DE 10 2011 084 204 A1 discusses a method for activating safety actuators of a motor vehicle.

SUMMARY OF THE INVENTION

Against this background, a method, furthermore a control unit which uses this method, and finally a corresponding computer program according to the main claims are provided using the approach presented here. Advantageous refinements of and improvements on the device specified in the independent claim are possible by way of the measures indicated in the dependent claims.

According to specific embodiments, in particular adaptive setting of a positioning of a driver before triggering of safety devices and before a collision or an impact of the vehicle may be carried out as a function of a driving mode. The driving mode may be set manually or at least partially automatically in this case, for example. In other words, a bimodal setting, for example, of pre-crash parameters or pre-impact parameters of a vehicle may be carried out as a function of a driving mode. If the driver drives manually, in particular only limited safety measures may be undertaken to maintain a driving task as far as possible. In the case of at least partially automatic driving, for example, greater belt forces, seat length adjustments, and the like may be applied, since the driving task is typically not affected.

According to specific embodiments, in particular a usage of safety systems which act before an impact or so-called pre-crash systems may advantageously be optimized for a driver in the event of an impact by an adaptive utilization of an intervention with respect to impact loads and driving mode. For example, in the event of triggering of safety devices, the driving mode, i.e., manual or at least partially automatic, may be taken into consideration. Measures before an impact on a driver's side, for example, the seat adjustment before the impact, belt forces, and the like, may only be or remain limited in the manual driving mode, for example, to avoid an influence on the driving task. Thus, in particular in the case of an at least partially automatic driving mode, a usage of safety devices in the event of an impact may be increased on the driver's side. Furthermore, an integrated safety system may be implemented. Moreover, a method according to specific embodiments and additionally or alternatively a control unit according to specific embodiments is simple to implement.

A method for setting an activation signal for activating at least one safety device of a vehicle is provided, the method including the following steps:

reading in a driving mode signal, the driving mode signal representing an item of information as to whether a manual driving mode or an at least partially automatic driving mode of the vehicle is set; and adapting at least one parameter of the activation signal using the driving mode signal, to set the activation signal.

This method may be implemented, for example, in software or hardware or in a mixed form of software and hardware, for example, in a control unit. The vehicle may be a motor vehicle, in particular a road vehicle, for example, a passenger automobile, a truck, or a utility vehicle. The at least one safety device may include a final control element, an actuating element, a triggering element, or the like. The at least one safety device may be able to be triggered before and additionally or alternatively during an accident of the vehicle. A parameter set or set of parameters of the activation signal may be adapted in the step of adaptation. By adapting the at least one parameter, the activation signal may be set in such a way that an activation of the safety device which is adapted to the particular driving mode takes place.

According to one specific embodiment, in the step of adaptation, at least one parameter may be adapted, which may influence triggering of at least one safety device related to a driver of the vehicle. The at least one safety device may be configured, for example, to adjust a driver's seat, a seat belt, or the like. Such a specific embodiment offers the advantage that a driver may be reliably protected from the consequences of an accident to an extent of a driving task, which is a function of the driving mode. The safety device may be provided according to different specific embodiments to deploy its protective effect already before an accident or during an accident.

According to one specific embodiment, the safety device may therefore be configured to carry out a pre-crash intervention at a level which is a function of the driving mode. A pre-crash intervention may be understood to mean that the safety device is already triggered before an accident, for example, an impact, to protect the driver from the consequences of the imminent accident. If the safety device is configured, for example, to carry out an intervention on the seat of the vehicle, the level of the safety device may relate, for example, to a seat position or a seat adjustment, which may be set depending on the driving mode. If the safety device is configured to carry out an intervention on the belt of the vehicle, the level of the safety device may relate, for example, to a belt force, which may be set depending on the driving mode. Therefore, in the step of adaptation, at least one parameter of the activation signal may be adapted, which causes a setting of the level of the safety device. In this way, a pre-crash intervention, which may relate to the seat or belt, for example, may be controlled using at least two levels, which are a function of the driving mode.

In the step of adaptation, at least one parameter may be adapted, which may cause a setting of a force, a velocity, an acceleration, an actuation distance, a displacement distance, and additionally or alternatively a point in time of triggering of the at least one safety device. Such a specific embodiment offers the advantage that a triggering behavior of the at least one safety device may be adapted accurately to the present driving mode.

In the step of reading in, a driving mode signal may also be read in, which has a first value when a manual driving mode of the vehicle is set and has a second value when an at least partially automatic driving mode of the vehicle is set. Additionally, the driving mode signal may optionally have at least one further value when a further driving mode, which is different from the manual driving mode and the at least partially automatic driving mode, is set. Such a specific embodiment offers the advantage that an actually existing or set driving mode may be recognized in a simple and reliable manner.

In response to the first value of the driving mode signal which is read in in the step of reading in, the at least one parameter may be set to a first parameter value in the step of adaptation. In this case, the first parameter value may cause partial triggering of the at least one safety device in the event of an activation of the at least one safety device. Partial triggering may be understood as triggering using limited force, limited velocity, limited acceleration, limited actuation distance, limited displacement distance, and additionally or alternatively limited duration. For example, the safety device is triggered only partially or with a delay in the case of partial triggering, in contrast to complete triggering. Such a specific embodiment offers the advantage that the driving task of manual driving may be largely performed during partial triggering of the at least one safety device, since the safety device acts less strongly on the driver, in contrast to complete triggering.

Furthermore, in response to the second value of the driving mode signal read in in the step of reading in, the at least one parameter may be set to a second parameter value in the step of adaptation. The second parameter value may cause complete triggering of the at least one safety device in the event of activation of the at least one safety device. Complete triggering may be understood as triggering using maximum force, maximum velocity, maximum acceleration, maximum actuation distance, maximum displacement distance, and additionally or alternatively maximum duration. An effect of the safety device induced in the case of complete triggering goes beyond an effect of the safety device induced in the case of partial triggering. Such a specific embodiment offers the advantage that a maximum protective effect of the safety device may be requested in the case of at least partially automatic or highly automated driving.

The method may include a step of providing the driving mode signal while using a driving mode device of the vehicle. The driving mode device may represent or include a vehicle control unit, a user input interface, or the like. Therefore, the driving mode signal may represent a sensor signal and additionally or alternatively a user input signal. Such a specific embodiment offers the advantage that reliable recognition, detection, or determination of a selected driving mode may be implemented.

The approach presented here furthermore provides a control unit, which is configured to carry out, control, and/or implement the steps of a variant of a method presented here in corresponding devices. The object on which the present invention is based may also be achieved rapidly and efficiently by this embodiment variant of the present invention in the form of a control unit.

For this purpose, the control unit may include at least one processing unit for processing signals or data, at least one memory unit for storing signals or data, at least one interface to a sensor or an actuator for reading in sensor signals from the sensor or for outputting control signals to the actuator, and/or at least one communication interface for reading in or outputting data, which are embedded in a communication protocol. The processing unit may be, for example, a signal processor, a microcontroller, or the like; the memory unit may be a flash memory, an EPROM, or a magnetic memory unit. The communication interface may be configured to read in or output data in a wireless and/or wired fashion, a communication interface which may read in or output data in a wired fashion being able to read in these data, for example, electrically or optically from a corresponding data transmission line or output them into a corresponding data transmission line.

A control unit may be understood in the present case as an electrical device which processes sensor signals and outputs control and/or data signals as a function thereof. The control unit may include an interface, which may be configured in hardware and/or software. In a hardware design, the interfaces may be part of a so-called system ASIC, for example, which includes greatly varying functions of the control unit. However, it is also possible that the interfaces are separate integrated circuits or are at least partially made of discrete components. In a software design, the interfaces may be software modules, which are present on a microcontroller in addition to other software modules, for example.

In one advantageous embodiment, an activation of at least one safety device of a vehicle or at least one setting of an activation signal for activating at least one safety device of a vehicle is carried out by the control unit. For this purpose, the control unit may make use, for example, of input signals or sensor signals such as a user input signal, an image signal from a camera recording the vehicle interior, or the like. The activation of the at least one safety device is carried out via actuators such as servomotors, ignitable propelling charges, and the like. A safety device in the form of an airbag may have multiple stages, for example, up to three stages. According to one specific embodiment, stages to be activated may be selected depending on the driving mode. A safety device in the form of an electrical belt may accordingly activate different force levels. According to one specific embodiment, a force level may be selected as a function of the driving mode.

A computer program product or computer program having program code is also advantageous, which may be stored on a machine-readable carrier or storage medium such as a semiconductor memory, a hard drive memory, or an optical memory, and is used for carrying out, implementing, and/or controlling the steps of the method according to one of the above-described specific embodiments, in particular when the program product or program is executed on a computer or a device.

Exemplary embodiments of the approach presented here are illustrated in the drawings and explained in greater detail in the following description.

BRIEF DESCRIPTION OF THE DRAWINGS

FIG. 2 shows a flow chart of a method for setting according to one exemplary embodiment.

FIG. 3 shows a flow chart of a process for parameter adaptation according to one exemplary embodiment.

DETAILED DESCRIPTION

Figure 1:
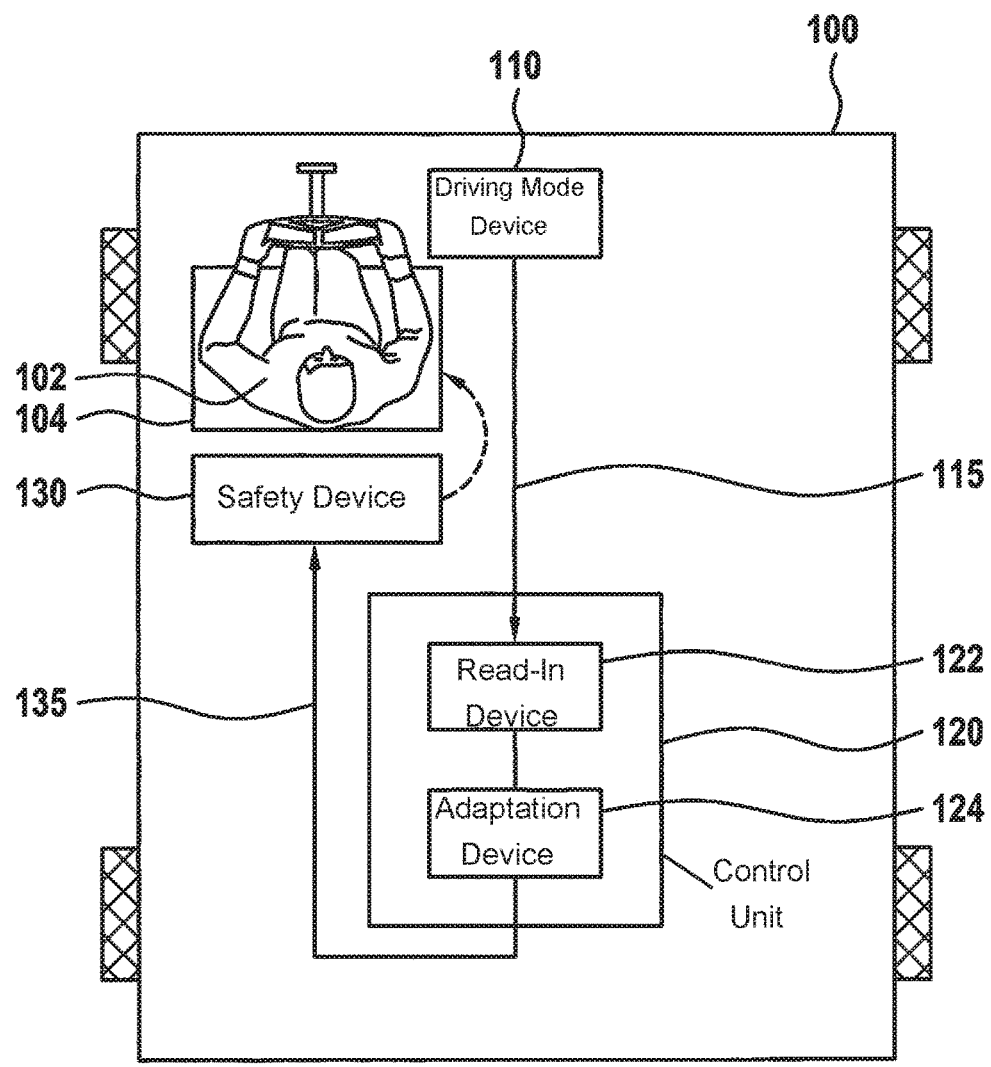
FIG. 1 shows a schematic view of a vehicle including a control unit according to one exemplary embodiment.

In the following description of advantageous exemplary embodiments, identical or similar reference numerals are used for the elements which are shown in the various figures and act similarly, a repeated description of these elements being omitted.

FIG. 1 shows a schematic view of a vehicle 100 including a control unit 120 according to one exemplary embodiment. According to the exemplary embodiment shown in FIG. 1, vehicle 100 is a motor vehicle in the form of a road vehicle, in particular a passenger automobile or the like, which is configured solely by way of example as a left-hand drive vehicle. In vehicle 100, a driver 102 is situated on a driver's seat 104 according to the exemplary embodiment shown in FIG. 1.

Vehicle 100 includes control unit 120 and, by way of example, only one safety device 130. According to the exemplary embodiment shown in FIG. 1, vehicle 100 additionally includes a driving mode device 110. Control unit 120 is connected to safety device 130 so it is capable of signal transmission.

Furthermore, control unit 120 is connected to driving mode device 110 so it is capable of signal transmission.

Driving mode device 110 is configured to detect or recognize a driving mode of vehicle 100. The driving mode is, for example, a manual driving mode or an at least partially automatic or highly automated driving mode. In the manual driving mode, a larger number of driving tasks are to be assumed by driver 102 than in the at least partially automatic driving mode. In the at least partially automatic driving mode, vehicle 100 may be controlled in a highly automated or partially automated way using a suitable control device, so that driver 102 has to assume no driving tasks or fewer driving tasks in comparison to the manual driving mode. Driving mode device 110 is configured to output or provide a driving mode signal 115. Driving mode signal 115 represents an item of information as to whether the manual driving mode or the at least partially automatic driving mode of vehicle 100 is set.

Safety device 130 is associated with driver 102 and additionally or alternatively driver's seat 104. Safety device 130 is configured to protect driver 102 in the event of an accident of vehicle 100. For this purpose, safety device 130 is configured in particular to have an effect on driver 102. For example, safety device 130 is configured to influence, change, or maintain a position of driver 102 in relation to vehicle 100, in particular in relation to driver's seat 104. Safety device 130 may also be configured to change the position of driver 102 by changing a setting of driver's seat 104. Safety device 130 may be triggered before and/or during an accident of vehicle 100. Safety device 130 is configured, for example, as a device for tensioning a seatbelt, a device for shifting driver's seat 104, and/or another safety device. Activation or triggering of safety device 130 is carried out by an activation signal 135. Safety device 130 may therefore be activated or triggered by activation signal 135.

Control unit 120 is configured to set activation signal 135 for activating the at least one safety device 130 of vehicle 100. For this purpose, control unit 120 is configured to set activation signal 135 using driving mode signal 115.

Control unit 120 includes a read-in device 122 and an adaptation device 124. Read-in device 122 is configured to read in driving mode signal 115. Furthermore, read-in device 122 is configured to relay an item of information with respect to the set driving mode to adaptation device 124. Adaptation device 124 is configured to adapt at least one parameter of activation signal 135 while using driving mode signal 115 or the item of information represented by driving mode signal 115. By way of the adaptation of the at least one parameter, activation signal 135 may be set in such a way that an optimum protection for the driver may be ensured by safety device 130 in consideration of the present driving mode.

Adaptation device 124 is therefore configured to adapt at least one parameter which influences triggering or triggering behavior of safety device 130 with respect to a driver 102 of vehicle 100. The at least one parameter adaptable by adaptation device 124 is capable, in the event of an activation of safety device 130 with the aid of activation signal 135, of causing a setting of a force, a velocity, an acceleration, an actuation distance, a displacement distance, and/or a point in time of triggering of safety device 130.

According to one exemplary embodiment, control unit 120 may be configured to provide activation signal 135 with the at least one adapted parameter. Optionally, control unit 120 may be configured to receive activation signal 135 from an interface to a vehicle device and to provide or output activation signal 135 having the at least one adapted parameter.

It is to be noted with respect to operation of control unit 120 in vehicle 100 that driving mode signal 115 which may be read in or is read in by read-in device 122 includes or represents a first value or a second value. The first value is provided when a manual driving mode of vehicle 100 is set, driver 102 having to assume a maximum number of driving tasks. The second value is provided when an at least partially automatic driving mode of vehicle 100 is set, driver 102 having to assume a minimum number of driving tasks. When a driving mode signal 115 having the first value has been read in with the aid of read-in device 122, the at least one parameter is set to a first parameter value with the aid of adaptation device 124. The first parameter value only causes partial triggering of safety device 130 in the event of activation of safety device 130. When a driving mode signal 115 having the second value has been read in with the aid of read-in device 122, the at least one parameter is set to a second parameter value with the aid of adaptation device 124. The second parameter value causes complete triggering of safety device 130, which goes beyond the partial triggering, in the event of an activation of safety device 130.

FIG. 2 shows a flow chart of a method 200 for setting according to one exemplary embodiment. Method 200 for setting is executable to set an activation signal for activating at least one safety device of a vehicle. Method 200 for setting is executable in conjunction with the control unit for using the control unit from FIG. 1 or a similar control unit. Method 200 for setting is therefore executable in conjunction with the vehicle from FIG. 1 or a similar vehicle.

Method 200 for setting includes a step 210 of reading in a driving mode signal. The driving mode signal read in in step 210 of reading in represents an item of information as to whether the vehicle is set to a manual driving mode or an at least partially automatic driving mode.

In a step 220 of adaptation, which follows step 210 of reading in, in method 200 for setting, at least one parameter of the activation signal is adapted using the driving mode signal to set the activation signal. In other words, the at least one parameter of the activation signal is adapted in this case depending on the driving mode represented by the driving mode signal.

According to one exemplary embodiment, method 200 for setting also includes a step 230 of providing the driving mode signal while using a driving mode device of the vehicle. Step 230 of providing is executable before step 210 of reading in in this case.

FIG. 3 shows a flow chart of a process 300 for parameter adaptation according to one exemplary embodiment. Process 300 is executable to adapt at least one parameter of an activation signal for activating at least one safety device of a vehicle while using a driving mode. In this case, process 300 is executable in conjunction with the method for setting from FIG. 2 or a similar method and/or in conjunction with the control unit or using the control unit from FIG. 1 or a similar control unit.

Process 300 reaches a branching point 310, at which it is determined whether the driving mode is at least partially automatic.

When the driving mode is not set to automatic driving, i.e., when manual driving is set as the driving mode, process 300 passes over to a block 322. In block 322, at least one parameter, for example, force, velocity, acceleration, and displacement is set to a balanced level before an impact, to obtain a vehicle control capability of the driver.

When the driving mode is set to at least partially automatic driving, process 300 passes over to a block 324. In block 324, at least one parameter, for example, force, velocity, acceleration, and displacement is set to a high level before an impact, for example, to a full absolute value with regard to impact loads.

In this case, for example, two different parameter sets for measures on a driver's side before an impact are used as a function of a driving mode in process 300 for parameter adaptation.

If an exemplary embodiment includes an "and/or" linkage between a first feature and a second feature, this is to be read to mean that the exemplary embodiment according to one specific embodiment includes both the first feature and the second feature and according to another specific embodiment it includes either only the first feature or only the second feature.

What is claimed is:

1. A method for setting an activation signal for activating at least one safety device for a vehicle, the method comprising:
   reading in a driving mode signal, the driving mode signal representing an item of information as to whether a manual driving mode or an at least partially automatic driving mode of the vehicle is set; and
   adapting at least one parameter of the activation signal for activating the at least one safety device while using the driving mode signal, to set the activation signal, wherein:
      in the reading in, a driving mode signal is read in, which has a first value when a manual driving mode of the vehicle is set, and has a second value when an at least partially automatic driving mode of the vehicle is set, and
      in response to the first value of the driving mode signal read in, in the adapting, the at least one parameter is set to a first parameter value, the first parameter value causing partial triggering of the at least one safety device in the event of activation of the at least one safety device.

2. The method of claim 1, wherein, in the adapting, at least one parameter of the activation signal is adapted, which influences triggering of at least one safety device with respect to a driver of the vehicle.

3. The method of claim 1, wherein the safety device is configured to carry out a pre-crash intervention at a level as a function of the driving mode, and wherein in the adapting, at least one parameter of the activation signal is adapted, which causes a setting of the level of the safety device.

4. The method of claim 1, wherein, in the adapting, at least one parameter of the activation signal is adapted, which causes a setting of at least one of a force, a velocity, an acceleration, an actuation distance, a displacement distance, and a point in time of a triggering of the at least one safety device.

5. The method of claim 1, wherein, in response to the second value of the driving mode signal read in, in the adapting, the at least one parameter is set to a second parameter value, the second parameter value causing complete triggering of the at least one safety device in the event of activation of the at least one safety device.

6. The method of claim 1, wherein the driving mode signal is provided while using a driving mode device of the vehicle.

7. The method of claim 1, wherein, in response to the second value of the driving mode signal read in, in the adapting, the at least one parameter is set to a second parameter value, the second parameter value causing complete triggering of the at least one safety device in the event of activation of the at least one safety device.

8. A control unit for setting an activation signal for activating at least one safety device for a vehicle, comprising:
   a reading in arrangement to read in a driving mode signal, the driving mode signal representing an item of information as to whether a manual driving mode or an at least partially automatic driving mode of the vehicle is set; and
   an adapting arrangement to adapt at least one parameter of the activation signal for activating the at least one safety device while using the driving mode signal, to set the activation signal, wherein:
      in the reading in performed by the reading in arrangement, a driving mode signal is read in, which has a first value when a manual driving mode of the vehicle is set, and has a second value when an at least partially automatic driving mode of the vehicle is set, and
      in response to the first value of the driving mode signal read in, the adapting arrangement sets the at least one parameter to a first parameter value, the first parameter value causing partial triggering of the at least one safety device in the event of activation of the at least one safety device.

9. A non-transitory computer readable medium having a computer program, which is executable by a processor, comprising:
   a program code arrangement having program code for setting an activation signal for activating at least one safety device for a vehicle, by performing the following:
      reading in a driving mode signal, the driving mode signal representing an item of information as to whether a manual driving mode or an at least partially automatic driving mode of the vehicle is set; and
      adapting at least one parameter of the activation signal for activating the at least one safety device while using the driving mode signal, to set the activation signal, wherein:
         in the reading in, a driving mode signal is read in, which has a first value when a manual driving mode of the vehicle is set, and has a second value when an at least partially automatic driving mode of the vehicle is set, and in response to the first value of the driving mode signal read in, in the adapting, the at least one parameter is set to a first parameter value, the first parameter value causing partial triggering of the at least one safety device in the event of activation of the at least one safety device.

10. The computer readable medium of claim 9, wherein, in the adapting, at least one parameter of the activation signal is adapted, which influences triggering of at least one safety device with respect to a driver of the vehicle.

* * * * *